(12) United States Patent
Neighbours

(10) Patent No.: US 10,287,794 B2
(45) Date of Patent: May 14, 2019

(54) CONCRETE TOWER AND RELATED FORMWORK AND RELATED METHOD OF CONSTRUCTION

(71) Applicant: Gregory John Neighbours, Western Springs, Auckland (NZ)

(72) Inventor: Gregory John Neighbours, Auckland (NZ)

( * ) Notice: Subject to any disclaimer, the term of this patent is extended or adjusted under 35 U.S.C. 154(b) by 0 days.

(21) Appl. No.: 15/115,513

(22) PCT Filed: Jan. 30, 2015

(86) PCT No.: PCT/IB2015/050700
§ 371 (c)(1),
(2) Date: Jul. 29, 2016

(87) PCT Pub. No.: WO2015/114573
PCT Pub. Date: Aug. 6, 2015

(65) Prior Publication Data
US 2017/0218652 A1  Aug. 3, 2017

(30) Foreign Application Priority Data
Jan. 31, 2014  (NZ) ........................................ 620584

(51) Int. Cl.
*E04H 12/34* (2006.01)
*E04G 11/22* (2006.01)
(Continued)

(52) U.S. Cl.
CPC ........... *E04H 12/341* (2013.01); *E04G 11/22* (2013.01); *E04G 11/28* (2013.01); *E04G 13/021* (2013.01);
(Continued)

(58) Field of Classification Search
CPC ..... E04H 12/341; E04H 12/342; E04H 12/12; E04G 13/021; F03D 13/20; F03D 13/10
(Continued)

(56) References Cited

U.S. PATENT DOCUMENTS 3,714,304 A * 1/1973 Carner et al. ............. B28B 7/22
264/219
3,761,551 A * 9/1973 Ogata ................... E04H 12/341
249/17
(Continued)

FOREIGN PATENT DOCUMENTS

CH      585835      3/1977
CH      666317      7/1988
(Continued)

OTHER PUBLICATIONS

Written Opinion of the International Searching Authority, dated Jul. 16, 2015, from corresponding International Application No. PCT/IB2015/050700.
(Continued)

*Primary Examiner* — Brian E Glessner
*Assistant Examiner* — Adam G Barlow
(74) *Attorney, Agent, or Firm* — Brient IP Law, LLC

(57) ABSTRACT

A collar assembly of or for a tower being formed by progressively higher concrete composition pours into reinforcement including formwork defined cavities, the assembly comprising or including; a higher subassembly adapted as a collar to selectively index to a zone of the tower being formed, a lower subassembly adapted as a collar to selectively index to a zone of the tower being formed, and a jacking arrangement whereby (I), when the lower subassembly is zone indexed and the higher subassembly is not, the higher subassembly can be raised relative to the lower subassembly and the zone to a fresh indexing height and (II),
(Continued)

Figure 1:
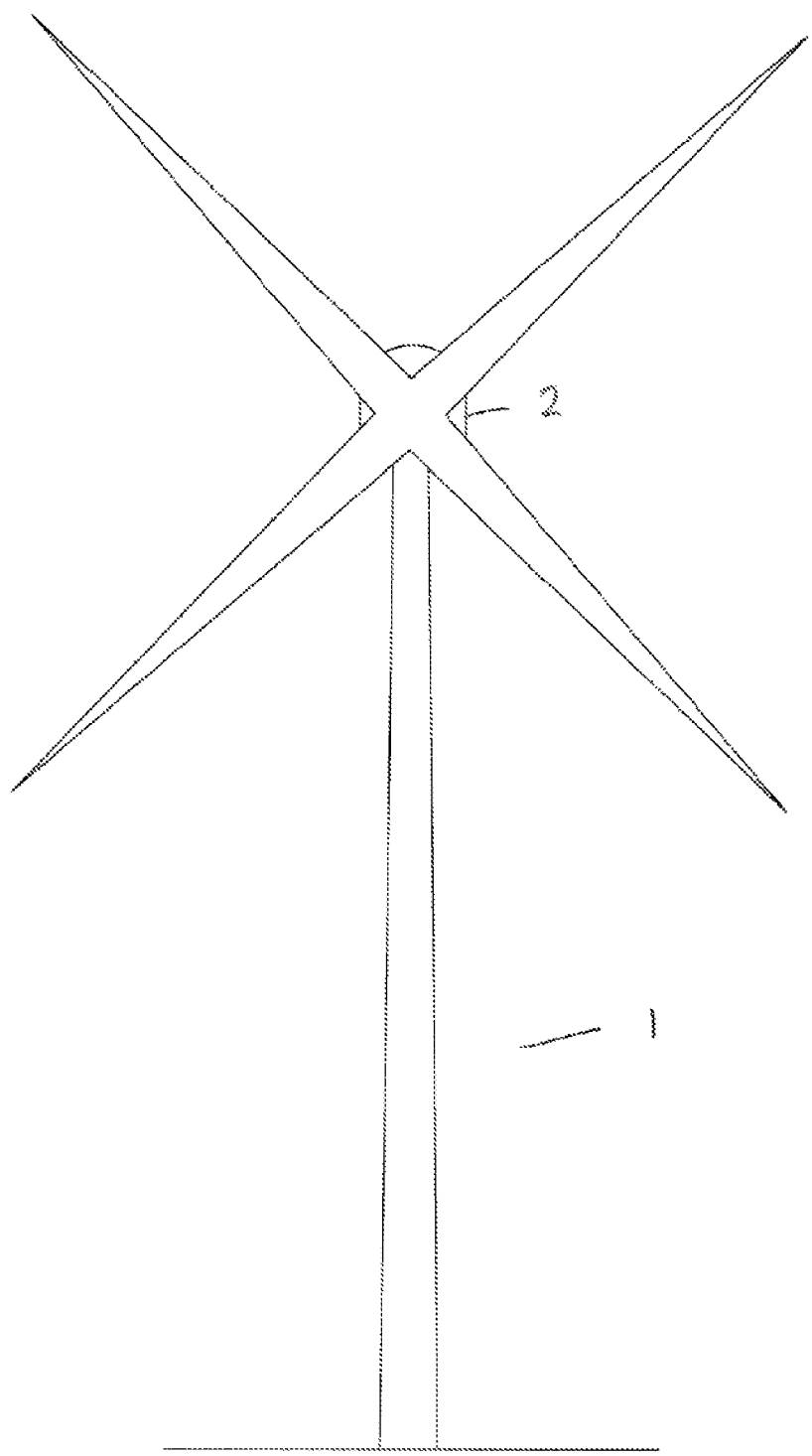

when the higher subassembly is zone indexed and the lower subassembly is not, the lower subassembly can be raised to a fresh indexing height.

12 Claims, 14 Drawing Sheets

(51) Int. Cl.
    *E04G 11/28*     (2006.01)
    *E04H 12/12*     (2006.01)
    *F03D 13/20*     (2016.01)
    *F03D 13/10*     (2016.01)
    *E04G 13/02*     (2006.01)

(52) U.S. Cl.
    CPC ........... *E04H 12/12* (2013.01); *E04H 12/342* (2013.01); *F03D 13/10* (2016.05); *F03D 13/20* (2016.05); *F05B 2240/912* (2013.01); *Y02E 10/728* (2013.01)

(58) Field of Classification Search
    USPC .................................. 52/123.1, 122.1, 204.5
    See application file for complete search history.

(56) References Cited

U.S. PATENT DOCUMENTS

| | | | |
|---|---|---|---|
| 4,060,358 A | 11/1977 | Fougea | |
| 4,562,989 A | 1/1986 | Scheller | |
| 4,694,933 A | 9/1987 | Sinko | |
| 7,969,037 B2 | 6/2011 | Segovia et al. | |
| 8,297,025 B2 | 10/2012 | Huynh Tuong et al. | |
| 8,443,571 B2 * | 5/2013 | Tadayon | F03D 13/10 52/745.18 |
| 8,601,748 B2 * | 12/2013 | Delago | F03D 13/10 52/119 |

FOREIGN PATENT DOCUMENTS

| | | | | |
|---|---|---|---|---|
| DE | 19936603 | | 2/2001 | |
| EP | 0960986 | | 12/1999 | |
| EP | 3099866 | | 12/2016 | |
| GB | 1294842 | | 11/1972 | |
| GB | 1294842 A | * | 11/1972 | ............. E04G 11/22 |
| WO | 2015114573 | | 8/2015 | |

OTHER PUBLICATIONS

International Search Report, dated Jul. 16, 2015, from corresponding International Application No. PCT/IB2015/050700.
International Preliminary Report on Patentability, dated Aug. 11, 2016, from corresponding International Application No. PCT/IB2015/050700.

* cited by examiner

CONCRETE TOWER AND RELATED FORMWORK AND RELATED METHOD OF CONSTRUCTION

CROSS-REFERENCE TO RELATED APPLICATIONS

This application is the National Stage of International Application No. PCT/IB2015/050700, filed Jan. 30, 2015, entitled "A Concrete Tower and Related Formwork and Related Method of Construction," which claims priority to New Zealand Application No. 620584, filed Jan. 31, 2014, entitled "A Concrete Tower and Related Formwork and Related Method of Construction," the entire disclosures of which are incorporated by reference herein in their entirety.

The present invention relates to the construction of tower structures and to related apparatus, formwork, methods, procedures and the like applicable thereto.

Tower structures can be manufactured by a number of techniques.

A tower structure of interest to us is one that can be used to support wind turbine nacelles. These generally are of a form with a circular exterior surface when viewed horizontally but with a reduction in the diameter of that circular exterior surface as the tower gets higher.

The present invention recognises that there may be instances where a tower made from reinforced concrete may be used as an alternative to structures normally used for such wind turbine towers.

The present also appreciate that techniques applicable to such towers for wind turbines may equally be applicable to towers for other purposes whether convergent on its sides or not.

It is therefore an object of the present invention to provide methods of construction, related systems, formwork etc that lend themselves to the erection of a tower that can be used to support the nacelle of a wind turbine.

It is an alternative and further object of the present invention to provide formwork which is able to be used, and procedures of use, to define a generally frustoconical inner and/or outer surface of an upwardly convergent and/or divergent and/or otherwise varying substantially annular horizontal section of a wind turbine tower, or which at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

In a first aspect the invention may be said to be a collar assembly of or for a tower being formed by progressively higher concrete composition pours into formwork defined cavities, said assembly comprising or including;
 a higher subassembly adapted as a collar to selectively index to a zone of the tower being formed,
 a lower subassembly adapted as a collar to selectively index to a zone of the tower being formed, and
 a jacking arrangement whereby (I), when the lower subassembly is zone indexed and the higher subassembly is not, the higher subassembly can be raised relative to the lower subassembly and the zone to a fresh indexing height and (II), when the higher subassembly is zone indexed and the lower subassembly is not, the lower subassembly can be raised to a fresh indexing height.

Preferably the formwork defined cavities are concrete reinforcement including formwork defined cavities.

Preferably each subassembly is selectively indexed by engagement to the tower at abutments (be it blind or through holes or slots) on the exterior or the tower.

Preferably the jacking arrangement comprises at least one actuator to control movement and relative position between the higher and lower subassembly.

Preferably the actuator comprises at least one of hydraulic rams and screw threads and winches and a ratchet system.

Preferably the jacking arrangement comprises guides to guide the subassemblies for linear movement relative each other.

Preferably the jacking arrangement is the guide for guiding the subassemblies.

Preferably the jacking arrangement comprises two or more jacks located at or about the collar periphery.

Preferably the jacking arrangement comprises four jacks located at or about the collar periphery.

Preferably the jacking arrangement comprises five or more jacks located at or about the collar periphery.

Preferably these jacks are actuators selected from a kind as herein described.

Preferably the lower and upper subassemblies index with the tower not at the upper edge of the tower being.

Preferably the lower and upper subassemblies index with the tower at abutments presented at the outside wall(s) of the tower being formed.

Preferably the higher and lower assemblies are of a trellis or skeletal type form.

Preferably the collar assembly is octagon shaped in plan.

Preferably the collar comprises multiple sub-collars/doughnuts/frames/subassemblies.

Preferably the higher subassembly comprises an intermediate level.

Preferably the higher subassembly comprises an intermediate level and the guides attach, locate or seat at the intermediate level as well as the lower subassembly.

Preferably there is no intermediate level and the guides attach, locate or seat at the higher subassembly.

Preferably the guides are a kind selected from one of a rail, track, telescopic arrangement.

Preferably the guides support the actuator.

Preferably the higher subassembly comprises a gantry crane.

Preferably and rail system.

Preferably the gantry is at the top of the higher subassembly.

Preferably the gantry crane is a distance higher than that of a formwork or prefabricated reinforcing cages above the intermediate level.

Preferably the gantry crane can shift formwork laterally from outside the tower footprint to be located above the tower and within its footprint.

Preferably the gantry crane can shift formwork from outside the higher subassembly to within the higher subassembly.

Preferably the gantry crane is adapted and configured to shift a nacelle from outside the collar to within the collar.

Preferably a nacelle is secured to it as the tower is formed.

Preferably the higher subassembly includes mounts for securing a nacelle to said higher subassembly.

Preferably the collar can index/unindex with the tower without the collar girth of the subassemblies being altered.

Preferably the collar can index/unindex without the girths of the subassemblies being altered.

Preferably wherein the lower subassembly can index/unindex with the tower.

Preferably the lowermost section of the higher subassembly can index/unindex.

Preferably the indexing by one, and preferably both, subassemblies is by means of a deployable gang of inwardly movable members of said respective subassemblies.

Preferably the indexing is via one or more movable members to become located with/on complementary abutment formations of the tower.

Preferably these abutment formations are defined by the formwork in the formation of the tower.

Preferably these abutment formations are one or more complimentary engagements formed into the concrete casts of the tower.

Preferably the engagements are blind or through slots or holes.

Preferably the moveable members are trusses.

Preferably the moveable members comprise pads that in operation are hydraulically forced onto more than two sides of the tower to hold the collar assembly tightly in place relative the tower.

Preferably the collar assembly comprises access platforms and stairways for workers at the top of the tower being formed, during construction of a tower.

Preferably the collar assembly comprises an internal access platform supported by either the collar or the formwork to allow access to the internal surface of the inner formwork.

In a further aspect the present invention may be said to be a poured concrete tower construction tooling for a tower being formed by progressively higher concrete composition pours into formwork defined cavities, said tooling comprising a collar assembly as herein before described and a plurality of formwork pods each able to receive and form a concrete pour to define section of a defined height of the tower.

Preferably each formwork pod comprises an inner and outer formwork.

Preferably a said cavity is defined between the inner and outer formwork of each said formwork pod.

Preferably a different set of inner formwork and outer formwork is used for each zone.

Preferably each different set defines a different shaped cavity.

Preferably each formwork pod is adapted to bear directly on the partially formed tower prior to forming a new zone above the partially formed tower.

Preferably at least one prefabricated reinforcing cage is located within the cavity between inner and outer formwork of each formwork pod, prior to the cavity being at least partially filled with concrete.

Preferably is at least an inner and outer prefabricated reinforcing cage.

Preferably the internal formwork and outer formwork are configured to tie together via tie system.

Preferably the tie system is via nut and bolt between the inner formwork and outer formwork.

Preferably the tie system comprise a sleeve running intermediate the inner and outer formwork for the bolt to pass through.

Preferably the sleeve allows the bolt to not engage with poured concrete so the tie system can be removed once the concrete has cured.

Preferably the tie system is a hoop and strut arrangement.

Preferably the hoop/s surround/s the periphery of the outer formwork and/or inner formwork to constrain the formwork from being forced in a direction away from the tower's elongate axis.

Preferably a strut arrangement supports the inner formwork from being forced in a direction towards the centre of the tower's elongate axis.

Preferably the hoop surrounding the outer formwork is removable after the concrete is at least partially cured.

Preferably the strut is removable after the concrete is at least partially cured.

Preferably the collar assembly is for or is located at the top of a partially constructed tower and sets of formwork that define said cavities, wherein the sets of formwork are individually shaped to mould zones of said tower out of primarily reinforced concrete.

In a further aspect the present invention may be said to be a method of tower construction where the tower is of or includes peripheral walls of reinforced concrete, said method comprising or including;

a) defining a lower zone of said tower reliant on a cavity defined by internal formwork and external formwork surfaces and a concrete composition infusion of the reinforcing structure or structures between such surfaces, b) lifting a collar assembly that is about the immediately prior formed zone reliant on vertical support from the immediately prior zone, c) using the collar assembly to uplift from ground below, internal and external surface defining formwork for poured concrete composition formation of a next zone above and reinforcing in the cavity between said internal and external surfaces and locating said immediately prior formed zone d) infusing a concrete composition into the cavity and allowing this to cure, e) repeating steps b to d until the sequence of zones takes the tower to a desired height.

Preferably a nacelle is secured by and carried upwards by the collar assembly as the tower rises.

Preferably a nacelle is not lifted from ground below only after the tower reaches said desired height.

Preferably in step c, the lifting of said collar assembly occurs after formwork removal from that said immediately prior formed zone.

Preferably in step b, the lifting of said collar assembly also lifts said formwork from that said immediately prior zone.

Preferably in step c the formwork and reinforcing are lifted as one unit.

In a further aspect the present invention may be said to be a wind turbine tower assembly comprising a nacelle located at the top or adjacent the top of a tower, the tower being primarily of reinforced concrete incrementally constructed in-situ, wherein the nacelle was jacked upwardly to or adjacent the top in increments.

Preferably the nacelle is jacked upwardly to or adjacent the top in increments matched to at least some of the increments in height increase of the tower during its construction.

Preferably the nacelle was jacked upwardly to or adjacent the top in increments matched to at least the last of the increments in height increase of the tower during its construction.

Preferably the nacelle was jacked upwardly to or adjacent the top in increments matched to all the increments in height increase of the tower during its construction.

Preferably the nacelle is located on a collar during a first increment of construction of the tower on its foundation.

Preferably the nacelle is lifted up with the collar during construction of the tower.

Alternatively, preferably the nacelle is lifted via a winch to the top of the tower after the tower is completed.

Preferably the winch is located on the ground.

Preferably the winch is located on a collar near the top of the tower.

Preferably the nacelle located atop of the tower having been inserted through a space in the collar.

In yet a further aspect the present invention may be said to be a formwork system suitable for stage-wise creating a tower with a reinforced concrete wall of variable substantially annular horizontal section, said system comprising or including an inner surface defining assembly of outer formwork, and an outer surface defining assembly of inner formwork located within the outer formwork, wherein said inner formwork and outer formwork are tied each other to accommodate hoop stresses from concrete poured between said inner and outer surfaces.

In a further aspect there may be provided a formwork system suitable for stage-wise creating a tower with a reinforced concrete wall of variable substantially annular horizontal section over height, said system comprising or including an inner surface defining assembly of outer formwork, and an outer surface defining assembly of inner formwork, wherein there is provision for heating and/or insulation to speed set.

Preferably optionally said provision can be fluid heated piping.

In a further aspect the present invention may be said to be a tower constructed by incrementing internal and external formwork assemblies each defining a cavity to receive a concrete pour defining a section of tower, upwardly after a pour to define a said section and at least partial set by a process of partial disassembly and reassembly wherein, for each pour, and for each of the internal and external formwork assemblies, ties constrain the inner and outer formworks to one another to restrain forces due to concrete being poured into said cavity.

In yet a further aspect the present invention may be said to be a method of tower construction where the tower has a peripheral wall of reinforced concrete, said method comprising stack-wise creating the peripheral wall sequentially reliant on a formwork module of a set of formwork modules each defining a void to receive a concrete pour that will form a level of the tower wherein the void for each pour is provided by interior and exterior formwork assemblies.

Preferably the method comprises using interior and exterior formwork assemblies having one or more of the following characteristics:

(i) a near frustoconical form of outer formwork, (ii) a near frustoconical form of inner formwork, Preferably there is a resolution of hoop stresses by in part resolving back into the previous and by then cured concrete pour.

In still a further aspect the present invention is a wind turbine which includes a bladed nacelle supported by a tower constructed by the as herein described.

In still a further aspect the present invention may be said to be a method of poured concrete in-situ vertical tower formation which comprises stacking on top of a cured concrete section of tower previously formed, a first formwork internally and externally able to define for a pour a frustoconical external form with a hollow passage extending along the axis of that form and disassembling said first formwork prior and lowering said first formwork down the tower.

Preferably the method includes allowing the poured concrete to cure prior to disassembling, and hoisting second formwork up the tower said second formwork internally and externally able to define for a second pour a frustoconical external form as a continuation of the previously defined external form of the tower with a hollow passage extending along the axis of that form.

In still a further aspect the present invention may be said to be a method of vertically and incrementally constructing in-situ a wind tower carrying a nacelle with blades at the top, the method comprising, incrementally upwardly advancing with the top of the tower as is it is being formed said nacelle, supported by a support structure that is able to be secured at or near the top of the tower.

Preferably the support structure is adapted to step-wise engage to and lift itself relative the tower to upwardly advance the nacelle.

In a further aspect the present invention may be said to be a method of vertically forming a tower in-situ by progressively higher concrete composition pours into formwork defined cavities for the tower being formed using a collar assembly, said assembly comprising or including;

a higher subassembly adapted as a collar to selectively index to a zone of the tower being formed, a lower subassembly adapted as a collar to selectively index to a zone of the tower being formed, and a jacking arrangement to cause the lower and higher sub assemblies to vertically translate towards and away from each other, said method comprising:

when the lower subassembly is zone indexed and the higher subassembly is not, the higher subassembly is raised relative to the lower subassembly and the zone to a fresh indexing height and, when the higher subassembly is zone indexed and the lower subassembly is not, the lower subassembly is raised to a fresh indexing height.

Preferably prior to raising said upper subassembly to a fresh indexing height formwork is raised up from below and adjacent the tower by said collar assembly and located ontop of the previous and at least partly cured concrete composition pour.

Preferably said upper subassembly is raised to a fresh indexing height after said formwork has been located ontop of the previous and at least partly cured concrete composition pour.

Preferably such raising occurs after the formwork has been struck from its at least partially cured concrete pour.

Preferably said upper subassembly is raised to a fresh indexing height after said formwork received its concrete composition pour and has at least partially cured sufficient for the formwork to be struck, the raising or so raised upper subassembly lifting the formwork up relative the tower for subsequent lowering towards the ground below.

Preferably during raising and lowering of said formwork, said formwork is braced from said tower.

Preferably said formwork is braced by a brace that is guided for travel up and down the external wall of the tower.

Preferably the brace is a traveller that is coupled to said tower.

Preferably the brace is coupled about said tower.

Preferably the brace is coupled to each said formwork pod and each at a distance from said two as they are raised and lowered.

As used herein the term "substantially annular horizontal section" preferably refers to a hollow section preferably (but not necessarily) having (save for example for any openings or holes through or blind holes in, that may be provided and/or flooring extending relative thereto) a circular or generally circular inner surface and/or a circular or generally circular outer surface, whether of constant thickness or not. It will be appreciated that the surfaces may also be faceted and in cross section be for example hexagonal or other polygonal shape.

As used herein the term "variable substantially annular horizontal section" includes frustoconical forms, parabolic forms (or approximations thereto), whether rectilinear or curved in their divergence and/or convergence (as to wall exterior) as the tower rises.

As used herein "frustoconical" refer both to strictly frustoconical forms or trumpet shapes variations thereof which, if not truly annular in section are nonetheless somewhat similar in form (e.g., could be faceted, could be oval, elliptical or the like), or which, if sectioned vertically, may or may not be as regular as for a symmetrical frustoconical form. The term does not require a linearly progressing slope.

As used herein "stage-wise" means progressing in stages or in increments. It preferably comprises a pause.

As used herein the term "reinforced concrete" includes at worst concrete with little or no reinforcement but preferably includes at the very least concrete that has been pre-tensioned, may be capable of being post-tensioned or both (e.g. with steel reinforcement).

It is envisaged that the term "partially formed tower" can include the lower parts of the tower being constructed above and preferably from the foundation thereof or incremented parts thereof above the foundation (e.g. preferably the immediately preceding region moulded by the formwork). Preferably there has been an at least partial set of the immediately preceding "pour" and that is used to bear weight and to accommodate the stresses at the lower end of the assembly.

As used herein the term "pour" (or variations of it) includes the concrete matrix as moulded by the formwork irrespective of whether or not there has been a gravity feed or not of the concrete composition into the formwork. Most preferably there is a pumped up feed of a concrete composition into the formwork or concrete may be poured from kips of kibbles that are raised and lowered using for example a winch.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention will now be described by way of example only and with reference to the drawings in which:

FIG. 1: shows a front view of a wind turbine and tower.

Figure 2:
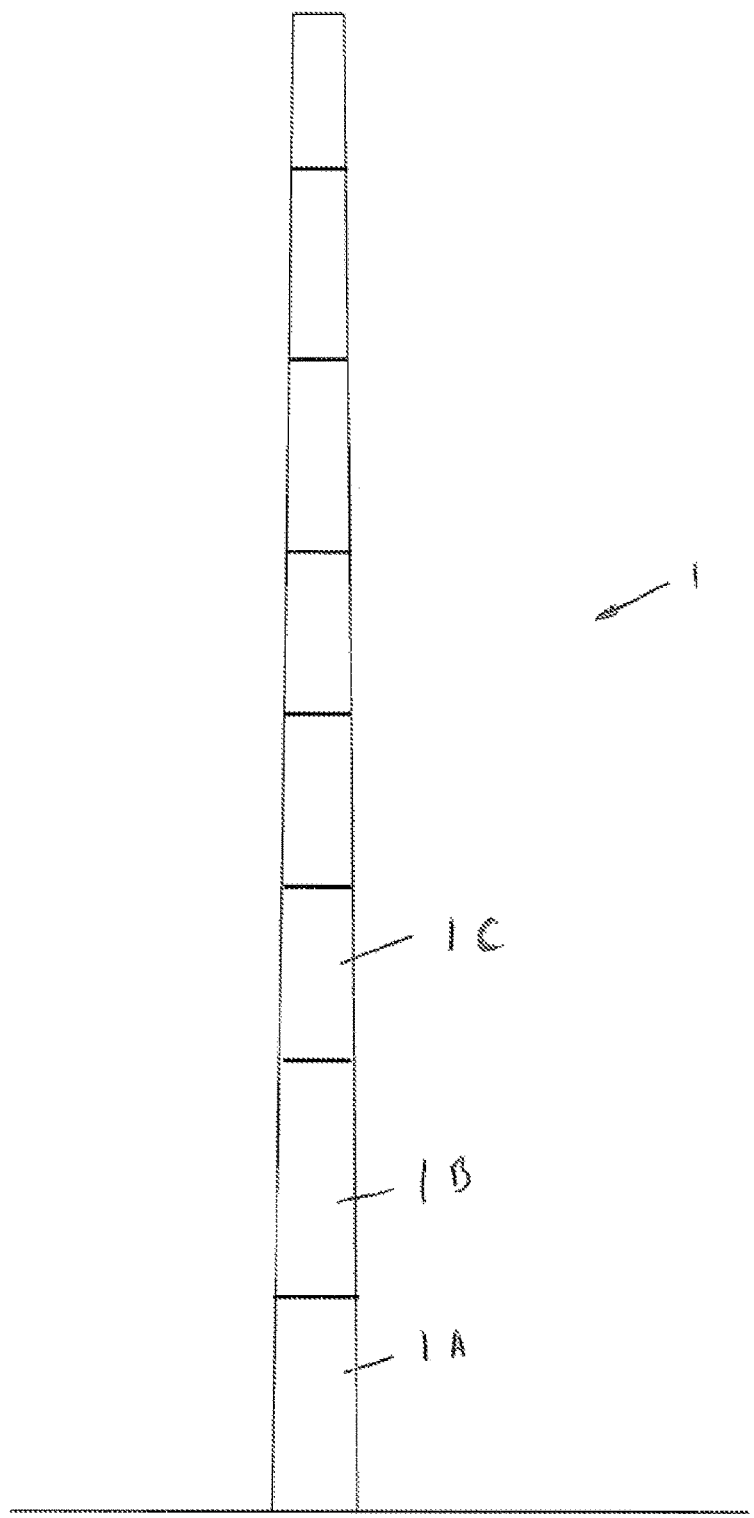

FIG. 2: shows a front view of a concrete tower for supporting a nacelle.

Figure 3:
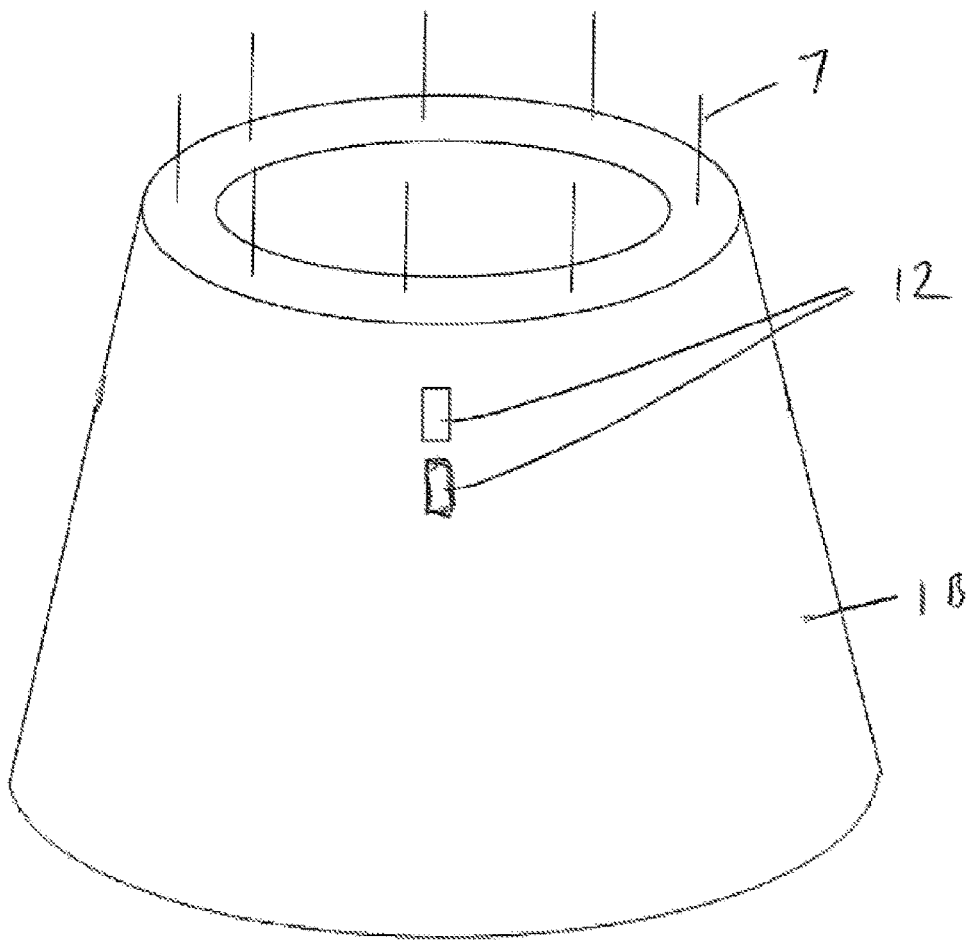
Figure 4A:
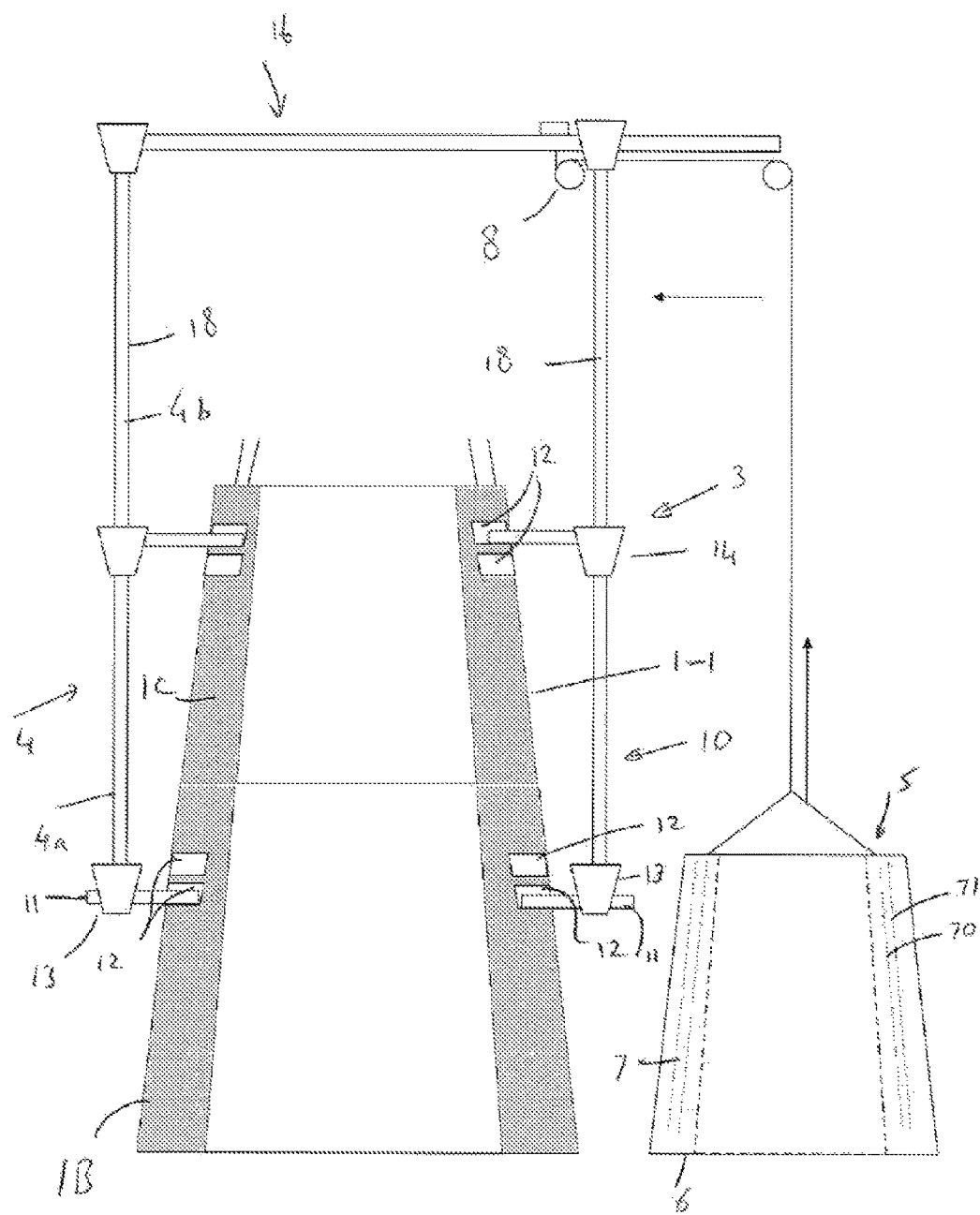
Figure 4B:
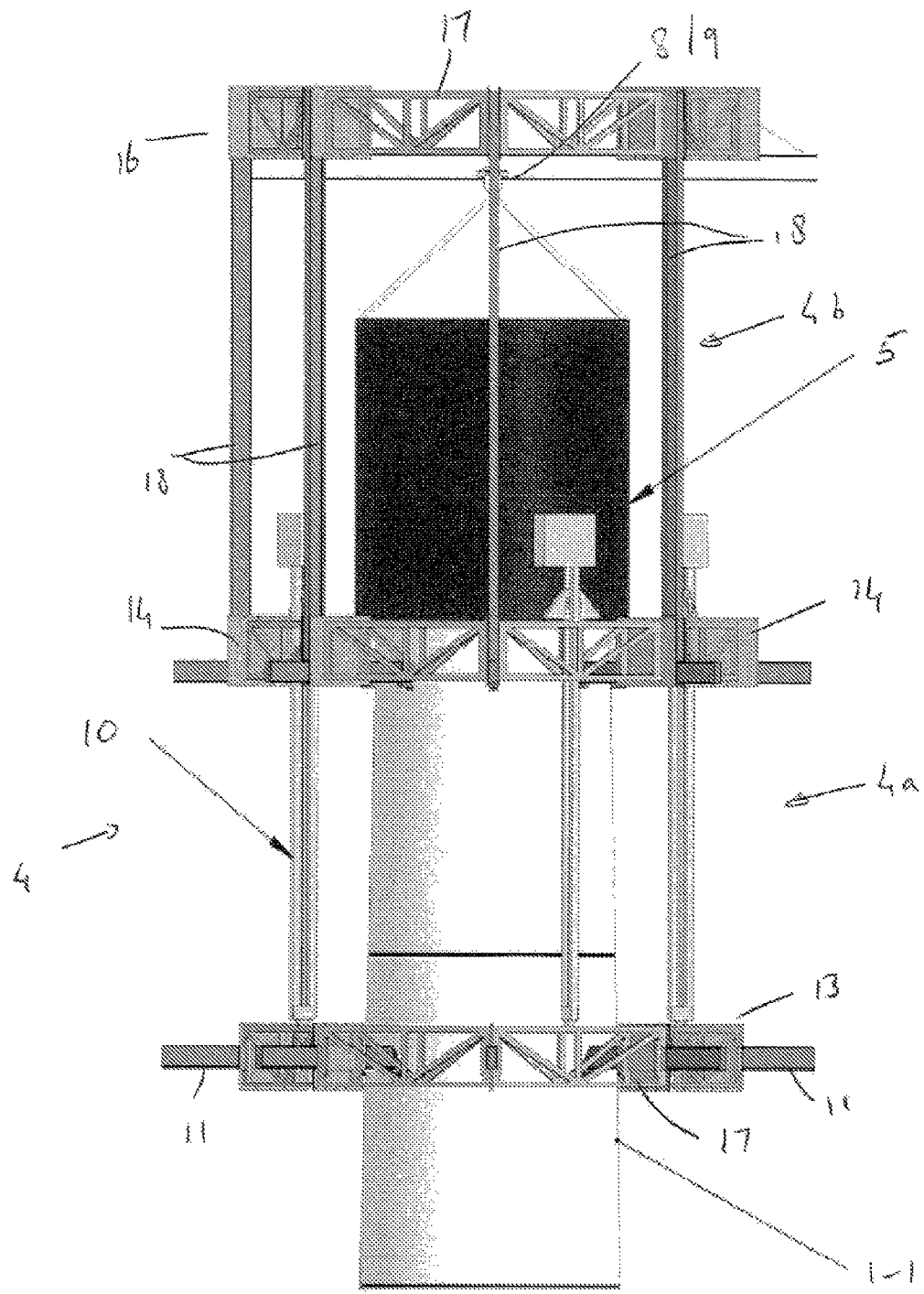
Figure 4C:
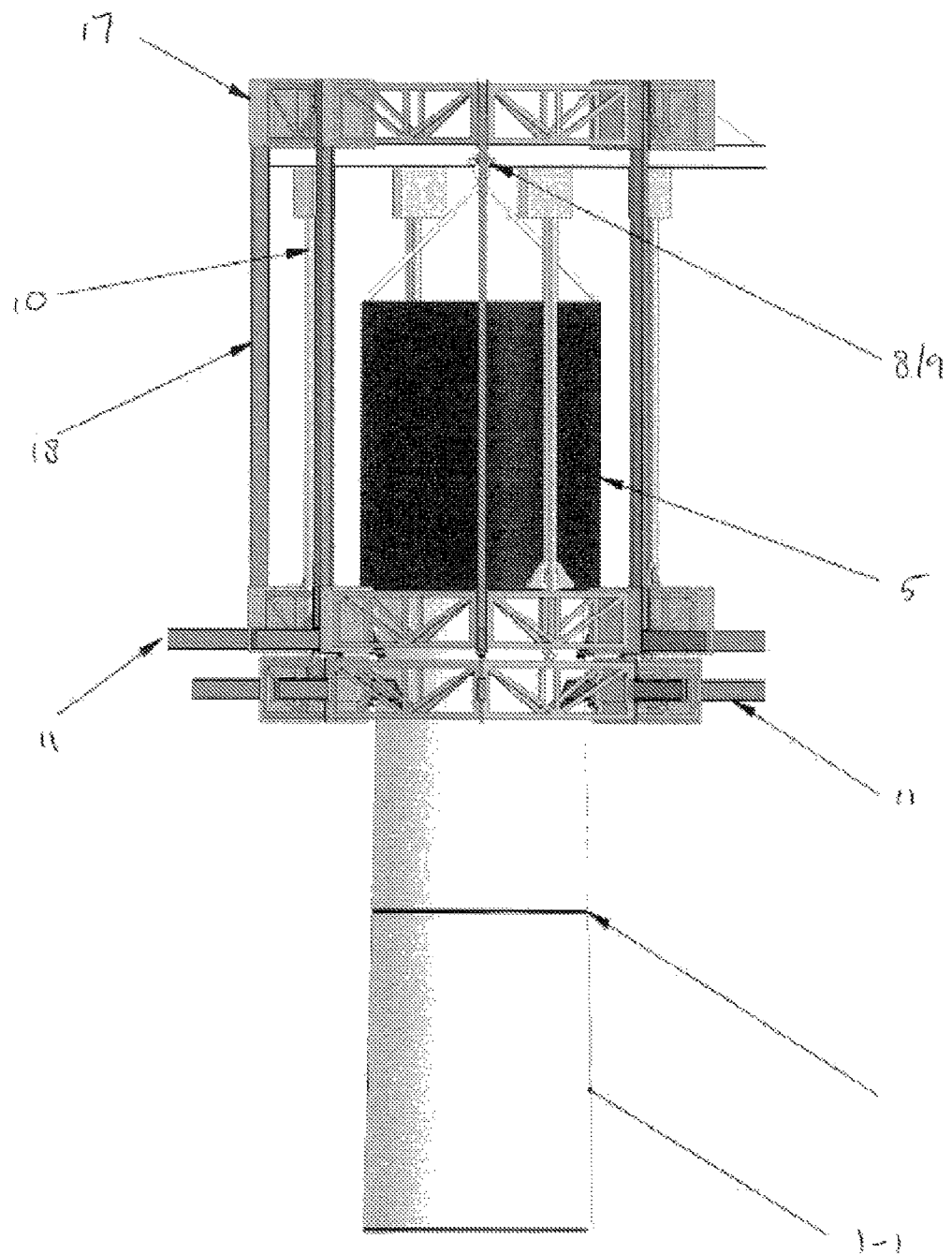
Figure 5:
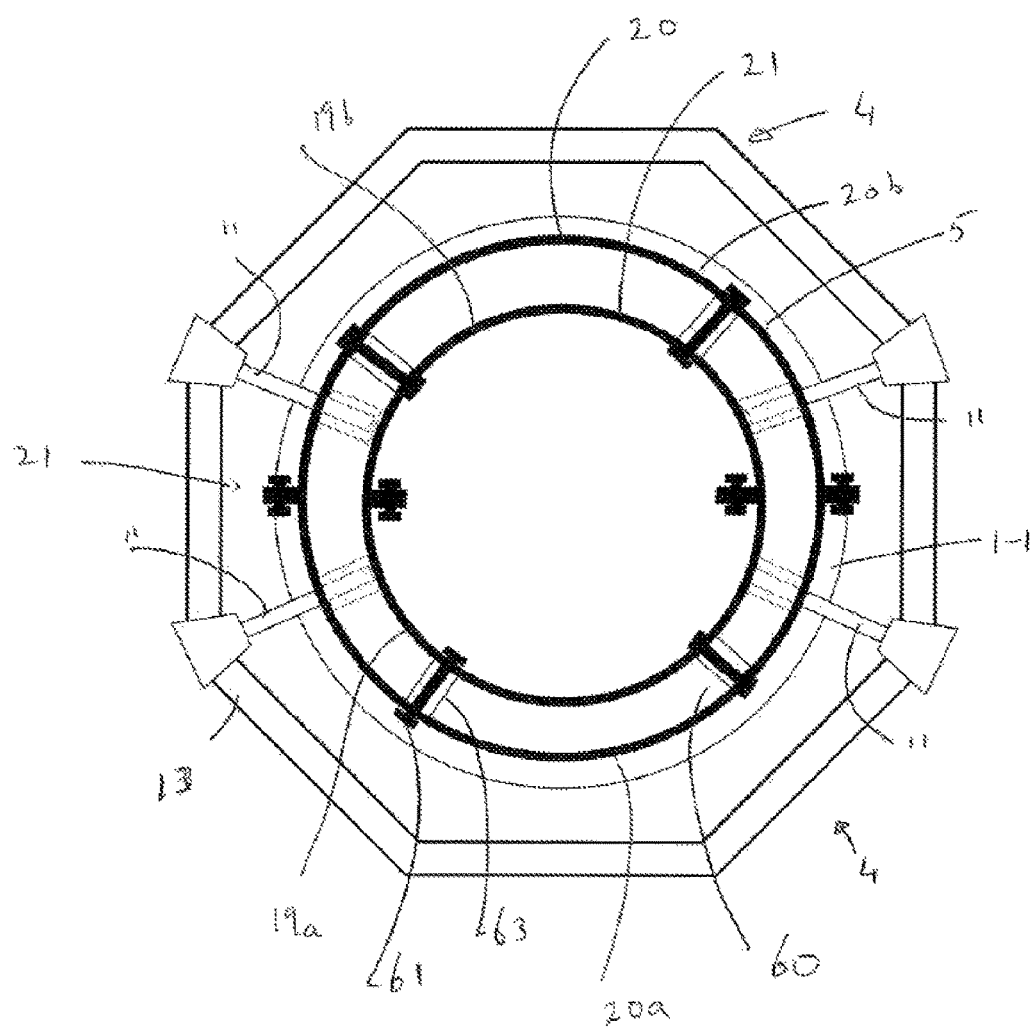
Figure 6:
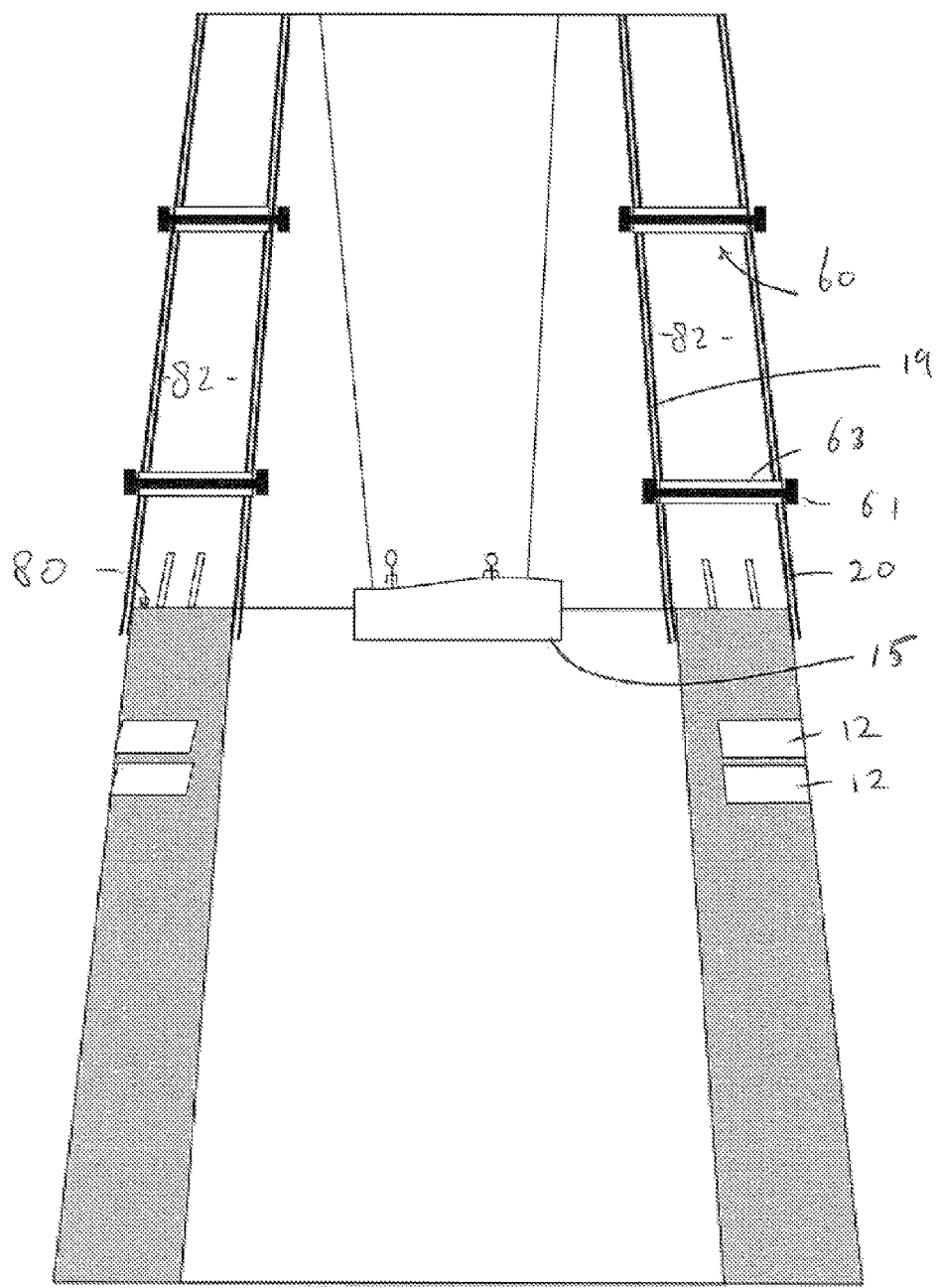
Figure 7:
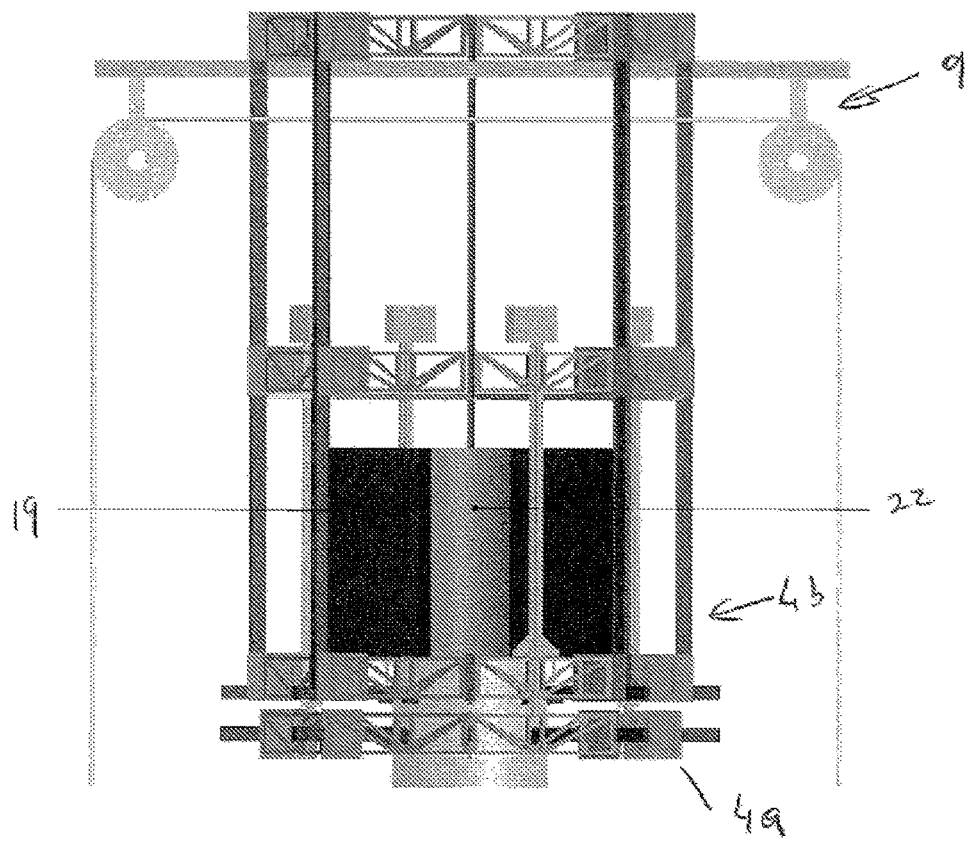
Figure 8:
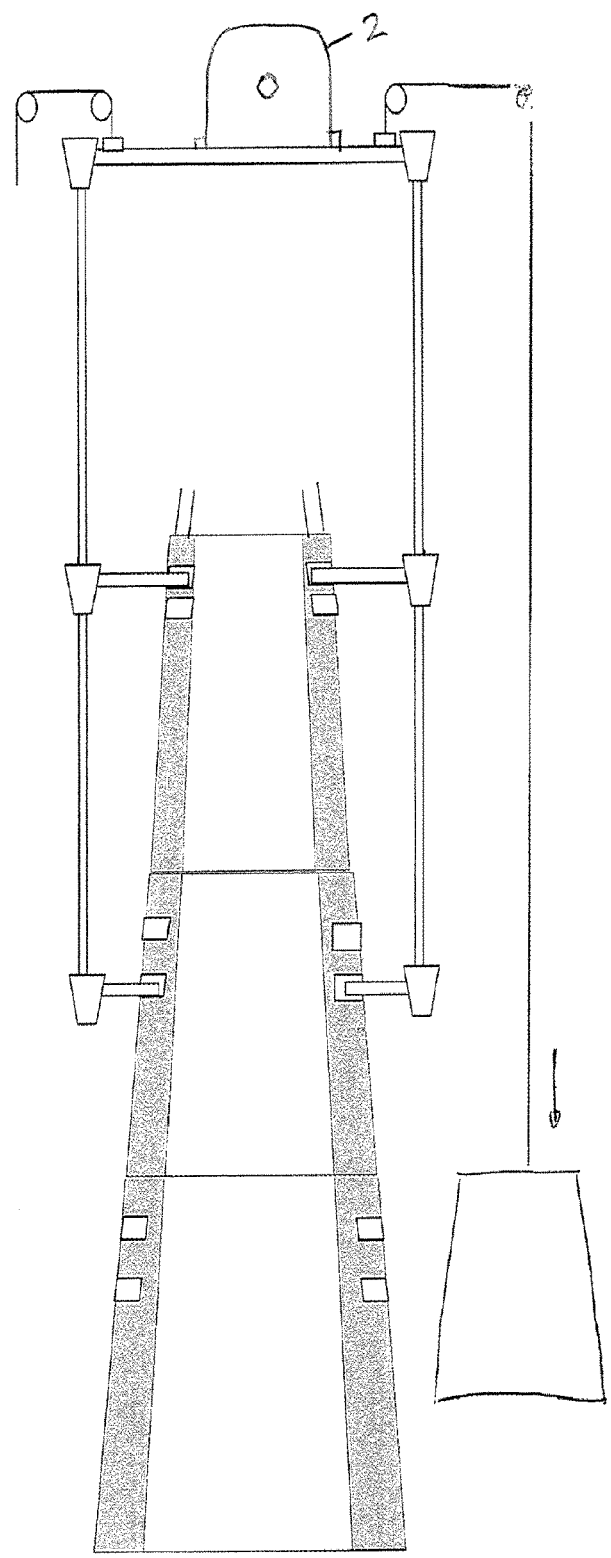
Figure 9:
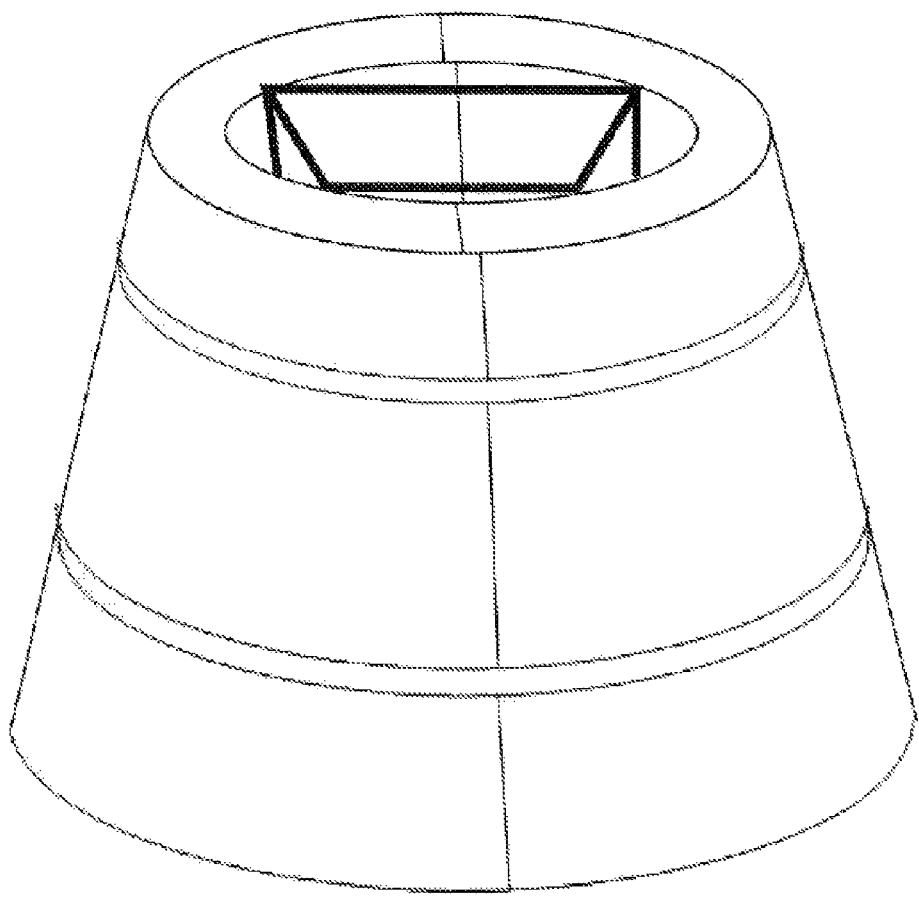
Figures 10A, 10B, 10C, 10D:
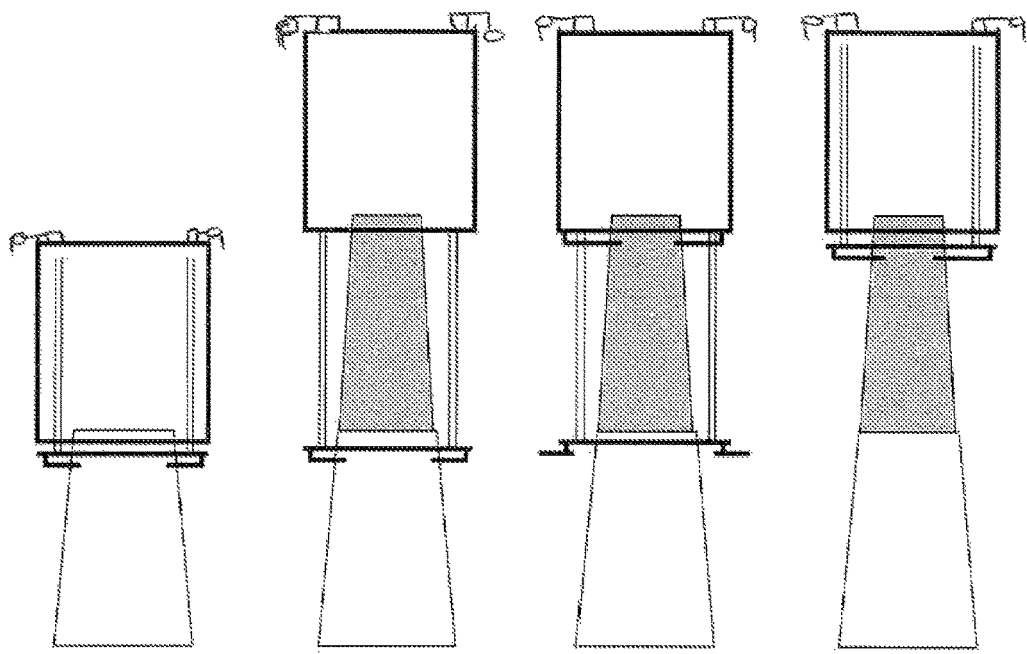
Figure 11:
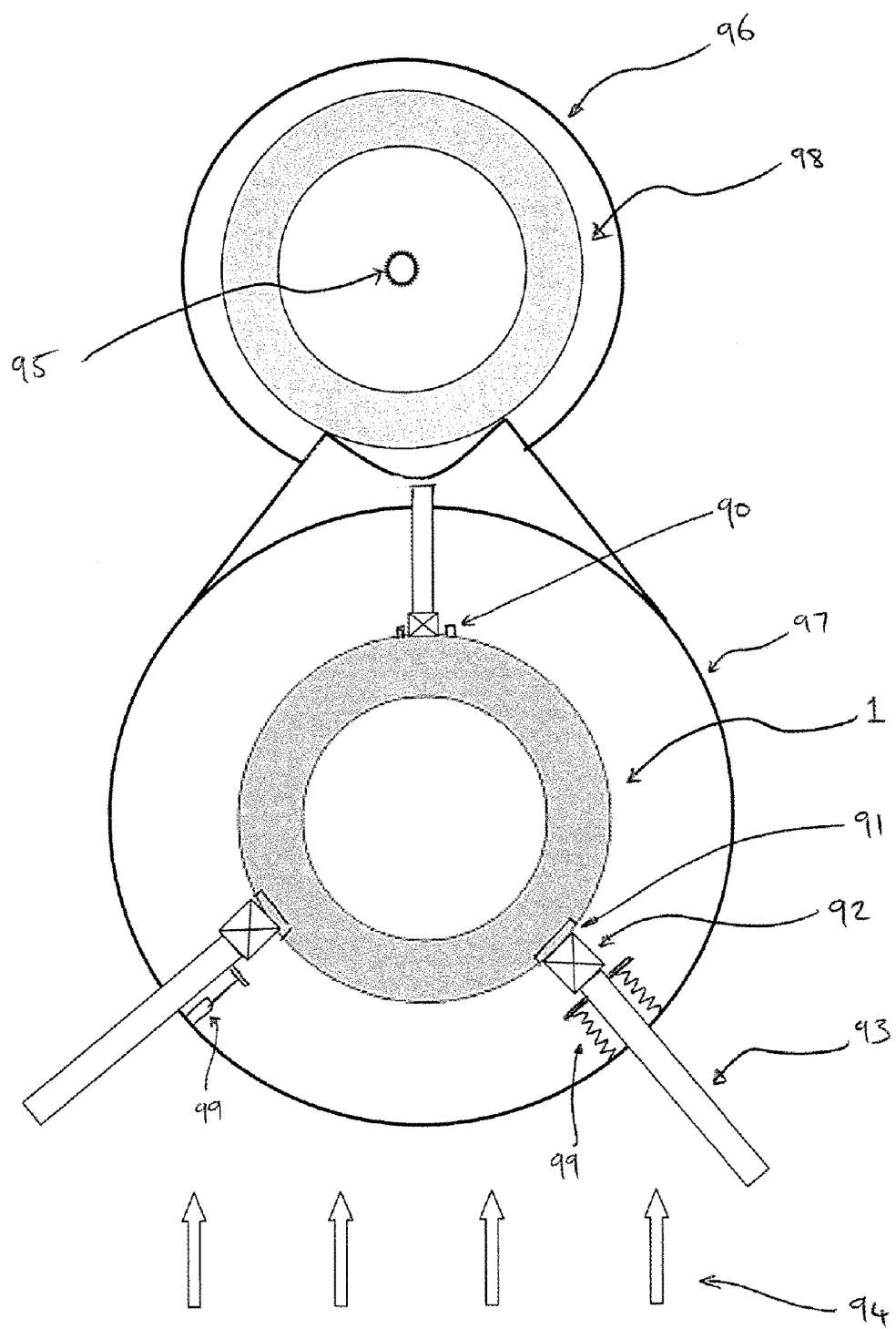
Figure 12:
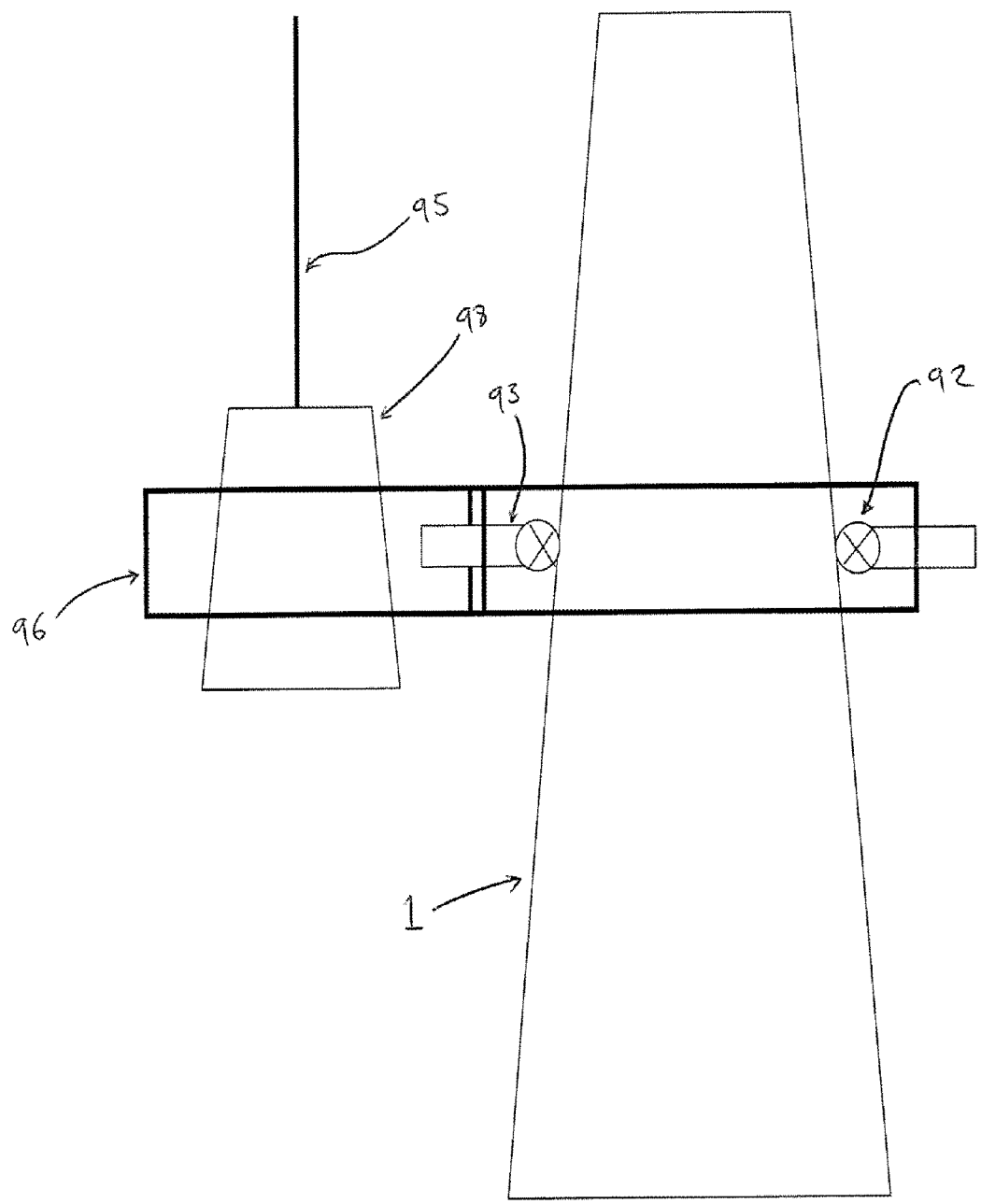

FIG. 3: shows a perspective view of a segment of concrete tower, the taper exaggerated to show detail, FIG. 4A: shows a simplified and partial sectional view of a partially erected tower and a machine and formwork pod about to be lifted into place, FIG. 4B: shows a simplified and partial sectional view of a partially erected tower and a machine and formwork pod lifted into place, FIG. 4C: shows a simplified and partial sectional view of a partially erected tower and a machine and formwork pod lifted into place, the collar assembly having compacted itself as part of its process of moving up, FIG. 5: shows a top view of a collar assembly supported by a segment of a partially constructed tower with internal and external formwork installed, ready to receive a concrete pour, and with tie rods installed connected to the internal and external formwork, FIG. 6: shows a front cross section view of FIG. 5 but without the collar assembly shown, FIG. 7: shows formwork having been struck and removed from the just poured and cured segment ready for lifting, FIG. 8: shows a front cross section view with the upper subassembly having been raised and formwork being lowered to the ground, FIG. 9: shows formwork in place and props internally to help the internal formwork react against hydraulic pressure of wet concrete and hoops about the external formwork for the same purposes, FIG. 10*a-d*: shows a sequence of the indexing/unindexing of the collar assembly with the tower and its process of jacking up to present itself for work at the next level, FIG. 11: is a schematic plan view of the lifting frame, and FIG. 12: is a schematic side view of FIG. 11.

With reference to the above drawings, in which similar features are generally indicated by similar numerals, a concrete tower structure 1 that may be formed according to the present invention is shown.

The tower structure 1 may be supported by a ground level foundation (not shown). The foundation may be pre-established. The foundation may include a kicker construction forming part of the tower that may or may not be formed using the methods as will herein be described. The present invention may be used in marine applications such as being supported on a seabed based foundation.

The tower structure 1 can be used to support a wind turbine nacelle 2.

The tower structure 1 may generally be of a form with a circular exterior surface when viewed horizontally but with a reduction in the diameter of that circular exterior surface as the tower gets higher. The tower may be hollow and have an interior surface that is concentric the exterior surface. The tower, over at least a substantial part may hence be of a substantially annular horizontal section.

Whilst the cross sectional profile of the tower defines a circular external surface, the external surface may be of other horizontal cross sectional profile. Likewise the internal surface may not be circular. They may for example be octagonal or other suitable polygonal form.

The tower structure is preferably tall, elongate, hollow and narrowing. The external shape may be frustoconical. It may be frustoconical up to a certain height and cylindrical to the top. Alternative shapes may be or may include a trumpet shaped, parabolic or other. In the preferred form the tower is tubular in horizontal section, tapered in over the height, and wider at the base reducing over height to a smaller diameter at the top.

The tower structure is preferably hollow to save on material costs, also allowing optional access via the internal cavity such as to access the nacelle, allow cabling etc to and from the nacelle.

The tower structure is formed by on site concrete pouring of tower segments 1A, B,C etc. Concrete is poured into a cavity formed for each segment by formwork. The tower is formed in increments, being a height of one pour or concrete. The apparatus and process for which will be described below.

In one embodiment there is provided concrete tower formwork configured to allow stage wise or incremental pouring of concrete to form a tower. The tower hence comprises of segments 1A, 1B, 1C etc, each representing a height of one incremental concrete pour as shown in FIG. 2.

After a foundation has been established (that may optionally include a differently established kicker construction forming part of the tower), the process according to the invention can be implemented. The process utilises a machine 3 that is placed/supported at the periphery of the first or lowermost segment of the tower that at that stage in the construction is the upper most segment of the tower. The machine enables a process for the production of cast in-situ reinforced concrete wind turbine towers.

The machine provides a collar assembly 4 about the segment and upwardly there from. As will be described later, the machine 3 is able to be jacked up to a higher position to facilitate the next segment of the tower structure 1 to be formed.

Also part of the process is the use of formwork to define each segment.

The machined is adapted to manage this formwork in place atop of the partially constructed tower. The machine is adapted to help lift and lower formwork. The formwork and associated concrete reinforcing is installed in the correct position in relation to the previously poured and cured concrete segment of the tower to form a reinforcing containing cavity to receive a concrete pour. Concrete is poured into the cavity, about the reinforcing.

The machine is able to move up to re-position itself to allow new formwork to be managed in place for the next segment of the tower to be created. The process is then repeated and a tower is created. Once a sufficient height of tower is reached the machine 3 can then lower itself in a similar fashion to how it raised, back down to the ground, ready for disassembly and to be moved for the construction of the next tower.

More detail of components and steps in the process will now be described.

The Machine

The machine 3 as seen in FIGS. 4A-C and 5 comprises a collar assembly 4.

The collar assembly 4 is configured to be able to 'crawl' up the periphery of the tower structure 1 as the tower structure 1 is being constructed. The primary purpose of the machine 3 is to facilitate the arrangement of formwork pods 5. During construction these pods preferably comprise of formwork 6 and reinforcing 7, onto the upper most section of the partially erected tower 1-1. It provides support to the formwork pods whilst being managed on top of the partially erected tower and optionally whilst concrete is poured into the formwork and cured. In the preferred form the formwork pods are preassembled and raised, such as by using a winch, from ground level using the machine as seen in FIGS. 4A and 4B.

A winch or part of a winch mechanism 8 may be provided either on the top of the machine and may form part of a gantry system 9. The winch is incorporated in the design to be located above the segment of concrete to be poured. The winch can also be used to lower the formwork. A motor with cable drum may form part of the winch, such a motor located at the machine or alternatively at ground level. The winch may also be used to lift and lower kibbles or skips used to deliver concrete to the top of the partially erected tower and/or for supporting a concrete pumping line. Shown in FIG. 4A is one winch but it will be appreciated that two or more winches may be mounted at or near the top of the machine. Preferably two winches are provided diametrically opposite. This lets one winch be used for lowering used formwork and the other is raising formwork.

The machine comprises the collar assembly 4. The collar assembly has primarily two subassemblies 4a and 4b. The subassembly 4a is the lower subassembly. The subassembly 4b is the higher subassembly.

The lower subassembly 4a is provided to be supported by a previously cured lower section of the tower. It preferably locates at such section. As an example shown in FIG. 4A, the lower subassembly 4a is located with the section 1B of the partially erected tower 1-1.

The higher subassembly 4b is provided so as to be able to locate with the next cured segment of the tower for the proposed of facilitating crawling, to help manage the formwork pods and may also support work platforms, stairwells, cranes, winches, jack guides and jack motors as will herein after be described.

A jacking arrangement 10, described in more detail below, is provided to act between the lower subassembly 4a and upper subassembly 4b. In a climbing mode, the jacks push off the lower subassembly 4a when the lower subassembly 4a is indexed with the partially erected tower to be able raise the upper subassembly 4b and pull up the lower subassembly 4a when the upper subassembly 4b is indexed with the partially erected tower.

The lower assembly 4a (and lower level of the higher subassembly 4b) also comprises mechanisms to slide indexing members or feet 11 in and out of preformed abutments such as slots 12 in the cured concrete. The abutments may be pockets or engagements or holes (through or blind). They may be abutments that project out of the tower instead. A plurality of these may be provided and these may be moulded by the formwork at each segment.

The slots 12 are where the collar assembly 4 is primarily supported by the tower and may carry the jacking loads back into the tower.

The feet 11 may slide in and out using a variety of actuation means such as hydraulic, air, electric, as well as manual sliding into place. The feet 11 are of a length great enough so that they can extend to reach an aligned slot 12. With reference to the lower subassembly 4a as seen in FIGS. 4B and 5, the feet 11 may extend from a collar 13 of the subassembly to the tower. The collar 13 is of a constant diameter or size to be able to sit about the tower at all increments and the feet are long enough to extend to tower wall to be able to locate with aligned slots. Near the base of the tower, the feet 11 need only extend a short distance to the tower wall from the collar 13. As the tower grows in height, and reduces in diameter, the feet 13 need to be able to extend a greater distance from the collar 13 to the tower wall.

The higher subassembly 4b may comprise of multiple levels, these levels performing different jobs. The higher subassembly may have a collar 14 that functions in a similar fashion as the collar 13. It may carry feet, like the feet 11 of the collar 13 to engage in slots of the tower.

A lower level of the higher subassembly 4b may also be provided with a platform for handling the formwork pods and other components. The work platform can support and provide workers access adjacent and to the region at where the next section of structure will be formed. A lower level of the higher subassembly 4b may be provided also for jacking purposes.

The collar assembly 4 may be modular comprised of parts or segments that facilitate rapid assembly and disassembly as well as providing transportable modules. Preferably there are 8 segments that can easily be transported between sites and assembled onsite to complete the machine ready for use. More or less segments may be used. Quick release pins or bolts may be utilised for the assembly and breakdown of the machine in a rapid fashion.

Both collars 13 and 14 may be a trussed formation 17 that when assembled is shaped like a doughnut or collar. A similar top collar 16 may also be provided. It is separated from the other collars by pillars or columns 18 forming part of the upper collar assembly 4b. This top collar may support the winch. The top collar 16 and the collar 14 move together.

The feet preferably slide relative the trusses in a radial direction. Preferably there is a foot for each truss segment of the two collars 13 and 14. The feet can slide both ways in a radial direction while engaging with the truss at or near one end as the structural couple and with the tower wall by seating at a slot that has been pre located into the wall at the other end. This allows full support of the machine to be established from at the external sidewall of the tower. And not the top ledge or internal wall. The machine is sufficiently clear of the top ledge, so as to allow the next pod to be placed there at and the next tower segment to be cast on top.

The assembled collar assembly 4 may be provided as a skeletal frame and provides where needed, sufficiently large gaps or gates between frame components to allow formwork pods 5 and any other construction components for forming the tower structure to be manoeuvred through. The gates may be of a width and in particular a height so as to allow for a formwork pod to be manoeuvred through such a gate without needing to change its rotational orientation. It merely needs to be translated from external of the upper sub assembly, through the gate to then be positioned above the previously formed segment and then be lowered to be in position ready to receive a concrete pour. Additional manoeuvring by tilting or tipping or twisting the pod should not be necessary by the provision of a gate of a sufficient size in order to manoeuvre the pod into position. In some instances prior to a pour to establish the next segment, may involve the assembly of two pods one on top of each other. The capacity of the winch for example may not be sufficient to lift some of the lower and due to the tapering shape, heavier lower pods into position. The construction of the tower may for such lower segments involve the assembly of at least two pods on top of each other to define a void for a single pour of concrete to establish a segment of the tower. The height of a gate is therefore preferably of a size to be able to just accommodate the tallest single pod used for establishing a single segment in a single concrete pour of the concrete tower.

The collar assembly 4 may also have many other functions. It may support access platforms and stairways for workers to work, install, assembly, fix, locate and disassemble the formwork, cages, ties and pour concrete. Preferably the collar assembly may comprise of cladding around its outer periphery, or at least around the working area to keep elements out. This keeps workers safe and protected, as well as keeping the construction area clear of debris and isolated from the weather. That way, concrete may be poured and cured in all weather conditions. Cladding may take the form of a permanent structure, or a more temporary structure such as plastic wrapping. Cladding is not shown in the figures. There may be multiple platforms at multiple levels. The platforms may be configurable and height adjustable depending the work being done. The platforms may also be configurable to adjust the distance between the platform and the tower wall, as the tower shrinks in diameter the higher it is and the work frame stays a constant diameter.

The collar assembly 4 may also include an internal platform 15 for accessing the internal side of the interior formwork. This internal platform 15 may in one form suspend from a higher subassembly 4b.

Jacks

The collar assembly 4 is able to crawl up the cured concrete tower to present itself useful to arrange and support the next formwork pod above the previous tower segment. This is facilitated by a jacking arrangement 10.

The collar assembly 4 comprises jacks to a) lift the higher subassembly 4b off and away from the indexed lower subassembly 4a and b) raise the lower subassembly 4b up to the indexed higher subassembly 4b. This way the collar assembly 4 can crawl up as the tower is constructed. The sequence being shown in schematic in FIGS. 10 *a-d*.

The jacks may also facilitate a lowering of the collar assembly back towards ground level after the tower has been constructed.

Preferably the jacking arrangement 10 comprises a plurality of jacks each having an actuation means. The actuation means in a preferred embodiment consist of hydraulic actuators such as hydraulic rams. However it should be obvious to skilled person that there are numerous ways to raise heavy masses upwards, such means could include winches, ratchets, rails, sliders, screw or worm drives etcetera.

Preferably the jacking arrangement comprises guides to guide the subassemblies. The guides in the preferred embodiment run from the lower subassembly 4a to the higher subassembly 4b. Preferably the guides extend between the collar 13 and collar 14.

In a preferred embodiment the jacking arrangement comprises four jacks located symmetrically about the tower. However it is envisaged that there may be less or more jacks depending on design and configuration.

A skilled person in the art will realise the jacks and/or jack guides may be located on any level between higher and lower subassembly. I.e. the jacks can be located on the higher subassembly and push down to push off the indexed lower subassembly. And similarly for when the lower subassembly is unindexed and being raised by the indexed higher subassembly, the jacks can pull the lower subassembly up to be in an indexed location or the jacks can drawn in from the lower subassembly and raise itself (the lower subassembly) up to the higher subassembly.

The jacks act on the outside of the tower rather than on the top ledge. They act via the feet 11 that are located with slots presented external of the tower at the external sidewall of the tower. This leaves the top ledge of the tower exposed and free to be engaged by the formwork to form the next tower segment on top of the exposed ledge.

Formwork

The present invention utilises multiple formwork for incremental creation of each segment of the tower construction. The formwork forms the cavity into which concrete can be poured to form the next segment of tower structure on top of the previously cured section of tower structure.

In a preferred embodiment the formwork is provided as a pre assembled formwork pod that may include reinforcing and other components that is hoisted from ground level to its required location at the top of the partially erected tower. It may also include post tensioning ducts or other "to be cast in" items.

Each formwork pod 5 is of a height sufficient to receive a pour of concrete and is of a geometrical shape of the segment to be poured. Hence multiple formwork pods are required to complete the concrete formation of one complete tower from its base to the top.

Each formwork pod may comprise of internal formwork 19 and external formwork 20. Preferably the internal formwork comprises of two formwork sections 19*a* and 19*b* able to connect together as seen in FIG. 5. The external formwork may likewise comprise of two formwork sections 20*a* and 20*b* able to connect together at a connection region 21.

Providing the formwork as sections helps in materials handling, strike and formwork removal after the poured concrete has set.

Dedicated formwork for each segment of the tower is preferably provided. Where the tower wall (internal and external) tapers, each section is formed using interior and exterior formwork for that section. Where only the exterior wall tapers and the interior wall remains a constant cross section, the interior formwork may remain the same whilst the exterior formwork is interchanged as each level is constructed.

The external formwork 19 forms the outer layer of the cavity, to in turn form a section of the external surface of the tower. And the internal formwork 20 forms the inner layer of the cavity, to in turn form a section of the inner surface of the tower.

The exterior and interior formwork are preferably each comprised of at least two removably engageable sections. For a frustoconical shaped tower each section is preferably semicircular in horizontal section.

Preferably the method used to connect formwork sections is a removable method to allow the formwork arrangement to be easily struck and disassembled once the concrete has been substantially cured. Methods could involve nuts and bolts, welding (and consequently cutting), riveting, hooking, strapping or methods described in ties, hoops extending about the external formwork and struts spanning across the gap formed by the internal formwork. Temporary methods of holding the sections in place may be used until a substantial system in put in place to lock the sections together.

Each segment of tower to be created, if it has different profile than the previous segment, requires a specific formwork pod to be put in place.

In the preferred form pre assembled formwork pods, that comprise of formwork and reinforcing and any other duct work or items that are to be cast into the concrete, are lifted from ground level into place. It is envisaged that assembly may, but undesirably occur at the top of the partially created tower.

After each pour has set/cured the formwork is struck and removed and lowered to the ground. The formwork can be removed after the concrete has cured and before the new formwork is raised, or the old formwork can be lowered whilst the new formwork pod is put in place.

Removal of the struck formwork occurs as the collar assembly crawls up. In FIG. 7, struck formwork that has been cleared from the new tower segment 22 is, in a condition secured to the higher subassembly 4*b*, able to travel up with the higher subassembly 4*b* as it jacks off the lower subassembly 4*a*. The simultaneous crawling up of the machine to set is self up for the next segment to be created and the lifting of the struck formwork is an efficient manner to get the used formwork clear of the segment it has just formed and in a condition to then lend itself to being lower to the ground. Before being lowered, formwork segments may be reassembled, at least in partial manner, to be lowered as one or a few units. Winches and/or overhead grantry will help move the formwork horizontally and clear of the line of the machine and/or tower structure below before being lowered to the ground. Alternative lifting/lowering methods can be used such as a separate crane.

Once lowered the formwork can be made ready for its next use, such as to create the next wind turbine tower at a wind farm, including loading/incorporating with it reinforcing and any other desired components. It is then ready to be delivered to the next site for creating a segment of another tower to be constructed.

Spreading/collapsing and/or expansion/contraction of the formwork sections relative about the radial axis due to hydrostatic wet concrete pressured can be restricted by a plurality of ties 60 located at intervals between the interior and exterior formwork.

In a preferred embodiment the ties 60 used may comprise of a nut and bolt arrangement 61. A bolt may span the width of the cavity between the internal and external formwork, and a nut fastens the bolt in place to thereby help prevent the internal and external formwork from separating. The bolt passes through a hole in both the inner and out formwork.

So that the bolts can be removed once the concrete has been poured, sleeves 63 run between the two corresponding holes, these sleeves do not allow concrete through. The bolt can then run through the hole, sleeve, hole without being in contact with the interior of the mould as shown in FIG. 5. Preferably the sleeves are plastic, but other compositions such as metal are possible.

In an alternative embodiment hoops can be place about the outer formwork to constrain the outer formwork. Hoops may be place over top of the periphery or installed in sections. In this embodiment, a strut arrangement may be placed in the internal section of the mould to prevent the inner formwork from collapsing inwards.

As can be seen in FIG. 6, the formwork preferably laps with the upper regions of the previously formed segment and the then upper most section of the tower structure. The upper edge 80 forms part of the cavity wall of the cavity 82 between the interior and exterior formwork.

Reinforcing

In a preferred embodiment reinforcing 7 is introduced with the formwork defined cavity for concrete to set about. Reinforcing 7 can be introduced in a multitude of ways. The reinforcing may be set in place before or after one of both of the interior and exterior formwork is put in place. Reinforcing 7 is preferably assembled with the formwork in a prefabricated manner be carried by one or both of the interior and exterior formwork. In a preferred embodiment the reinforcing is in the form of or can be assembled to a shaped cage. Preferably there is an internal cage 70 and an external cage 71.

The interior and exterior reinforcing cages are for concrete reinforcing near the inner and outer surface of the tower wall respectively.

To connect/join/tie the poured layer to the below cured layer, the cages are designed to be taller than the pour height of the concrete, so a distance of cage (eg tail ends or rebar) sticks out the top of the poured concrete as seen in FIG. 6. This region of cage is then integrated into the next pour, and so forth, so all layers share at least a part of the lower layers cage. Alternatively, tie rods may be used between segments as an example.

Concrete

Concrete is delivered via a concrete pump up the tower and into the cavity defined by the formwork. A typical curing time for concrete is ~24 hours before the next layer can be formed on top.

Alternative or Additional Aspects

A nacelle, in the construction of the tower as herein described, may be supported by the machine of the present invention and travel up with the machine as the tower is constructed. It is preferably supported in an manner to be located above the tower being constructed. It may be bolted, suspended, hoisted or otherwise secured to the machine. As seen in FIG. 8, is can be located on top of the machine.

This approach to getting a nacelle to the top of the tower, allows for the nacelle to be loaded onto the machine at a relatively low height, therefore not requiring a tall crane to subsequently lift the nacelle to the top of the tower. Once the tower is completed the nacelle can then be secured to the top of the concrete tower in its final location. The machine may appropriately support the nacelle in a manner to keep it out of the way of the tower construction process yet provide the nacelle at the top of the construction once the tower has been fully constructed without the need to use a tall crane to get the nacelle to the top. The nacelle may be lowered by or with the machine after the tower has reached is full height and lowered onto the tower. The nacelle is preferably supported by the machine whilst the tower is being constructed, to be in vertical alignment with its mount(s) at where it will be secured to the tower. This allows for the nacelle to be dropped down onto its mount(s) without the need for any further orientation being required.

It would be appreciated that the use of a machine as herein described or any other construction-like platform, rig, gantry, or similar that travels up with and is fully supported vertically by the tower as it's constructed and supporting a nacelle, may be used for constructing a concrete tower such as herein described by the use of formwork pods or by other construction techniques. It is envisaged for example that that a tower constructed by using a tower supported crane to lift pre-cast concrete sections up (rather than casting in situe) may utilise the crane structure to carry a nacelle as the tower grows in height.

It will be appreciated that once the tower is of a substantial height bracing guidance or support may need to be provided to the formwork being raised and lowered adjacent the tower. Such bracing or support is there to prevent the formwork from adversely swinging due to the effects of wind. Being preferably constructed for wind farm purposes these towers will naturally be built in windy conditions. To help ensure that no damage can occur to the towers and/or to the components used in its construction, bracing may be used to support items (i.e. pods) as they are raised as shown in FIGS. 11 and 12.

To prevent the pods, whilst hung from the winch/rope 95, from swinging under wind pressure, they are contained inside of a frame. The frame is able to control the positioning of a pod, or other item as it is raised or lowered up or down the tower, with respect to the tower.

The frame will react the wind load against the tower wall and prevent the pod from moving in an uncontrolled manner. The frame in one embodiment may be off constructed of two periphery frames. The first frame 97 will be around the tower 1 and provide a support for a secondary frame 96 which will contain the pod 98 or other item to be raised or lowered. The secondary frame 96 comprises buffers or other means to prevent the pods or other item to be raised or lowered from having too much uncontrollable movement within the secondary frame 96. The first frame 97 comprises bracing to keep the first frame 97 centred and biased to prevent movement with respect to tower 1.

A rail type arrangement is an example of one form of bracing that may be used for items being lifted and lowered adjacent the tower. The rail type arrangement may be simple protrusions 90 to form a channel on the periphery of the tower or they may be in the form of a slots, recesses or grooves 90 in wall face of the tower. Wheels, rollers or sliding systems 92 may be used to slide or rotate within these protrusions 90 or grooves 91.

The sliding system 92 needs to be able to follow the reducing the diameter of the tower as the first frame 97 travels up the tower 1 (or increasing diameter as the frame travels down the tower). As such the sliding systems 92 are located on extendable/retractable arms 93 which are biased towards the periphery of the tower 1. These arms 93 must be able to withstand the wind pressure 94 without being significantly moved. The biasing action or force may be maintained by a biasing mechanism 99 which can use actions or mechanisms known in the art for biasing such as spring pressure, gravity balances, electronic positional control or mechanical systems.

The engagement by wheels, rollers or sliding systems 92 to need to be located a minimum of at least two locations around the tower perimeter. Preferably there are three sliding systems 92 to prevent the frame from moving in any horizontal plane uncontrollably—as shown in FIG. 12.

Installation and Method

A preferred method of installation will now be described. The concrete tower structure is constructed in increments by setting up formwork pods and filling the formwork with wet concrete to a prescribed height. The formwork is then struck and removed and the process is then repeating after the machine has reset itself for use relative the previously poured section until the final tower wall height is reached.

The basic sequence of constructing a tower, following the establishing of a foundation, may in one form be as follows:
1. Prepare a base layer,
2. Install collar assembly to base layer, (base layer now defined as lower segment)
3. Locate a formwork pod on top of the lower segment layer, 4. Pour concrete into formwork defined cavity and about the inserts in the cavity,
5. Let concrete cure,
6. Strike the formwork and move it clear of the partially erected tower,
7. Lower formwork,
8. Raise collar assembly,
9. Repeat steps from 3 using a new formwork pod, until the tower is at the correct height.

Once the tower is at the correct height,
10. Lower the collar assembly to the ground by the reverse order as raising the collar assembly, and
11. Disassemble collar.

Raising the collar assembly is preferable done as follows and with reference to FIGS. 10a-10d:
1. Load is taken on the jacks and feet engaged with slots of the lower subassembly.
2. Feet of the of the upper subassembly are slid out of the slots,
3. The jacks raise the upper subassembly to the correct incremental distance, the formwork being connected and also raised,
4. The feet on the upper subassembly slide into the slots,
5. The jacks lower the upper subassembly so that full load is transferred of the jacks and the upper subassembly becomes weight bearing on the tower structure,
6. The jacks climb back to the start position lifting the lower subassembly up.

The machine climbs down the tower by the reverse sequence of climbing up and by using the existing slots in the external surface of the tower.

Alternative variations of the machine and process:
1. The formwork includes a temporary deck which acts as a fall protection measure as well as a ladder and work platform for personnel working inside the formwork pod. The deck forms a part of the formwork pod and is lifted in and out with the formwork.
2. Items that form permanent part of the internal wall of the concrete tower such as ladders and platforms can also be lifted in as part of the formwork segment. They can be attached to the wall by working off the protection deck then disconnected from the pod, and do not form part of the formwork pod when it is lifted out.
3. The nacelle can be lifted on to the machine while it is at the base of the tower and then lifted together with the machine as it progressively builds the concrete wind tower. The machine can lower the nacelle on to the top of the tower and the required connection made. The machine then climbs down the tower.
4. The components of the formwork pod, inner and outer forms, reinforcing can be lifted independently.
5. The formwork can remain inside the machine.

I claim:

1. A construction system of or for a tower being formed by progressively higher concrete composition pours into formwork pods, the system comprising: a collar assembly, and a plurality of formwork pods, the pods for use with the collar assembly, said assembly comprising:
   a) a higher collar subassembly to selectively index at an indexing height to a zone of the tower being formed by engagement to the tower at abutment formations on the exterior of the tower, the higher collar subassembly comprising a crane to shift the formwork pods from outside the higher collar subassembly to within the higher collar subassembly, and, after a said pour has set/cured within a formwork pod, to lower such used formwork pod to the ground,
   b) a lower collar subassembly to selectively index to a zone of the tower being formed by engagement to the tower at abutment formations on the exterior of the tower, and
   c) a jacking arrangement whereby (I), when the lower collar subassembly is zone indexed to the tower and the higher collar subassembly is not, the higher collar subassembly can be raised relative to the lower collar subassembly and the zone of the tower being formed to a higher indexing height and (II), when the higher collar subassembly is zone indexed to the tower and the lower collar subassembly is not, the lower collar subassembly can be raised to a higher indexing height at which it may be indexed to the tower,
   wherein each formwork pod comprises an inner and outer formwork, and a different set of outer formwork is used for successive zones of the tower, and
   wherein the abutment formations are defined by the formwork pods in the formation of the tower, and the indexing to the tower of each of the higher collar subassembly and lower collar subassembly is an indexing to the tower between indexing heights defined by the abutment formations of formwork pod defined concrete composition pours.

2. A system as claimed in claim 1 wherein the jacking arrangement comprises at least one actuator to control movement and relative position between the higher and lower collar subassemblies.

3. A system as claimed in claim 1 wherein the jacking arrangement comprises guides to guide the collar subassemblies for linear movement relative each other.

4. A system as claimed in claim 1 wherein the higher and lower collar subassemblies are of a trellis or skeletal type form.

5. A system as claimed in claim 1 wherein the higher collar subassembly comprises an intermediate level.

6. A system as claimed in claim 3 wherein the higher collar subassembly comprises an intermediate level and the guides attach, locate or seat at the intermediate level as well as the lower collar subassembly.

7. A system as claimed in claim 3 wherein the guides are a kind selected from one of a rail, track, telescopic arrangement.

8. A system as claimed in claim 3 wherein the guides support the actuator.

9. A system as claimed in claim 1 wherein the tower supported crane is a gantry crane.

10. A system as claimed in claim 1 wherein the tower supported crane is a gantry crane and comprises a carriage and rail system.

11. A system as claimed in claim 1 wherein the tower supported crane is a gantry crane and the gantry is at the top of the higher collar subassembly.

12. A system as claimed in claim 1 having a nacelle secured to it as the tower is formed.

* * * * *